US011470588B2

(12) United States Patent
Khoshnevisan et al.

(10) Patent No.: US 11,470,588 B2
(45) Date of Patent: Oct. 11, 2022

(54) TECHNIQUES FOR MANAGING PHYSICAL UPLINK CONTROL CHANNEL GROUPING FOR MULTIPLE TRANSMIT RECEIVE POINTS

(71) Applicant: QUALCOMM Incorporated, San Diego, CA (US)

(72) Inventors: Mostafa Khoshnevisan, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 16/947,168

(22) Filed: Jul. 21, 2020

(65) Prior Publication Data

US 2021/0068099 A1 Mar. 4, 2021

Related U.S. Application Data

(60) Provisional application No. 62/892,372, filed on Aug. 27, 2019.

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1812* (2013.01); *H04W 48/08* (2013.01)

(58) Field of Classification Search
None
See application file for complete search history.

(56) References Cited

U.S. PATENT DOCUMENTS

2016/0242182 A1* 8/2016 Chen .................... H04B 7/061
2018/0035339 A1* 2/2018 Mitsui .................. H04W 72/04
(Continued)

FOREIGN PATENT DOCUMENTS

WO WO-2019161056 8/2019

OTHER PUBLICATIONS

CHTTL: "Discussion on Multi-TRP Transmission", 3GPP Draft, 3GPP TSG RAN WG1 Meeting #97, R1-1907026, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728474, 5 pages, Retrieved from the Internet: URL: http://www.3gpp.org/ftp/Meetings%5F3GPP%5FSYNC/RAN1/Docs/R1%2D1907026%2Ezip. [retrieved on May 13, 2019] chapters 2. 3.

(Continued)

*Primary Examiner* — Bob A Phunkulh
(74) *Attorney, Agent, or Firm* — Dalei Dong; Harrity & Harrity, LLP

(57) ABSTRACT

Various aspects of the present disclosure generally relate to wireless communication. In some aspects, a user equipment may identify a first group of downlink cells communicating with a first transmit receive point (TRP) that is associated with a first uplink control channel cell; identify a second group of downlink cells communicating with a second TRP that is associated with a second uplink control channel cell; transmit first control information associated with the first group of downlink cells, using resources allocated for a first uplink control channel for the first uplink control channel cell, to the first TRP; and transmit second control information associated with the second group of downlink cells, using resources allocated for a second uplink control channel for the second uplink control channel cell, to the second (Continued)

TRP, the second control information being selectively transmitted contemporaneously with the first control information. Numerous other aspects are provided.

30 Claims, 6 Drawing Sheets

(51) Int. Cl.
*H04W 48/08* (2009.01)
*H04L 1/18* (2006.01)

(56) References Cited

U.S. PATENT DOCUMENTS

| | | | |
|---|---|---|---|
| 2019/0253976 A1* | 8/2019 | Pelletier | H04W 52/346 |
| 2019/0296881 A1* | 9/2019 | Ang | H04L 1/1819 |
| 2020/0037248 A1* | 1/2020 | Zhou | H04B 7/022 |
| 2020/0163023 A1* | 5/2020 | Pelletier | H04W 72/042 |
| 2020/0260475 A1* | 8/2020 | Yoshimura | H04L 5/0048 |
| 2021/0259004 A1* | 8/2021 | Takeda | H04L 1/1896 |
| 2021/0345306 A1* | 11/2021 | Takeda | H04B 7/022 |
| 2022/0029750 A1* | 1/2022 | Matsumura | H04W 72/0453 |
| 2022/0046672 A1* | 2/2022 | Yuan | H04L 5/0091 |

OTHER PUBLICATIONS

Huawei., et al., "Summary of AI: 7.2.8.2 Enhancements on Multi-TRP/PanelTransmission of Offline Discussion", 3GPP Draft, R1-1907706, 3GPP TSG-RAN WG1 Meeting #97, FL Summary of Enhancements ONNCJT_V1, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 16, 2019 (May 16, 2019), XP051739989, 66 Pages, Retrieved from the Internet:URL: http://www.3gpp.org/ftp/tsg%5Fran/WG1%5FRL1/TSGR1%5F97/Docs/R1%2D1907706%2Ezip [retrieved on May 16, 2019] The Whole Document.HUAWEI_Multi_TRP_2019_66_Pgs_EFS.

International Search Report and Written Opinion—PCT/US2020/043074—ISA/EPO—dated Oct. 9, 2020.

LG Electronics: "Enhancements on Multi-TRP/Panel Transmission", 3GPP Draft, 3GPP TSG RAN WG1 Meeting #98, R1-1908699, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765307, 19 pages, Retrieved from the Internet: URL: http://www.3gpp.org/ftp/tsg_ran/WG1_RL1/TSGR1_98/Docs/R1-1908699.zip. [retrieved on Aug. 17, 2019] chapters 2. 3.

Qualcomm Incorporated: "Multi-TRP Enhancements", 3GPP Draft, 3GPP TSG-RAN WG1 Meeting #97, R1-1907289, Multi-TRP Enhancements, 3rd Generation Partnership Project (3GPP), Mobile Competence Centre, 650, Route Des Lucioles, F-06921, Sophia-Antipolis Cedex, France, vol. RAN WG1, No. Reno, Nevada, USA, May 13, 2019-May 17, 2019, May 4, 2019 (May 4, 2019), XP051709312, 25 Pages, Retrieved from the Internet: URL: http://www.3gpp.org/ftp/tsg%5Fran/WG1%5FRL1/TSGR1%5F97/Docs/R1%2D1907289%2Ezip [retrieved on May 4, 2019] pp. 4-6, 3.1 POSCH and PDCCH Related Enhancements pp. 6-7, 3.1.1 UE Capability Framework for Multi-TRP pp. 7-8, 3.2.1 Joint HARQ-Ack Payload I Feedback p. 7, figure 1, sections 1-3, Introduction Agreement, p. 5, Agreement, Section 3.1.1, p. 6, Section 3.2, Section 3.2.1, p. 7.

Vivo: "Further Discussion on Multi-TRP/Panel Transmission", 3GPP Draft, 3GPP TSG RAN WG1 #97, R1-1906159_Further Discussion on Multi-TRP/Panel Transmission_Final, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 4, 2019 (May 4, 2019), XP051708200, 18 pages, Retrieved from the Internet: URL: http://www.3gpp.org/ftp/tsg%5Fran/WG1%5FRL1/TSGR1%5F97/Docs/R1%2D1906159%2Ezip. [retrieved on May 4, 2019], chapters 2. 3.1. 4.1.3. 5-7, Section 2.1. 3.1.

* cited by examiner

TECHNIQUES FOR MANAGING PHYSICAL UPLINK CONTROL CHANNEL GROUPING FOR MULTIPLE TRANSMIT RECEIVE POINTS

CROSS-REFERENCE TO RELATED APPLICATION

This Patent Application claims priority to U.S. Provisional Patent Application No. 62/892,372, filed on Aug. 27, 2019, entitled "TECHNIQUES FOR MANAGING PHYSICAL UPLINK CONTROL CHANNEL GROUPING FOR MULTIPLE TRANSMIT RECEIVE POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for managing physical uplink control channel grouping for multiple transmit receive points.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes: identifying a first group of downlink cells communicating with a first transmit receive point (TRP) that is associated with a first uplink control channel cell; identifying a second group of downlink cells communicating with a second TRP that is associated with a second uplink control channel cell; transmitting first control information associated with the first group of downlink cells, using resources allocated for a first uplink control channel for the first uplink control channel cell, to the first TRP; and transmitting second control information associated with the second group of downlink cells, using resources allocated for a second uplink control channel for the second uplink control channel cell, to the second TRP, the second control information being selectively transmitted contemporaneously with the first control information.

In some aspects, the UE is configured for separate hybrid automatic repeat request feedback for the first TRP and the second TRP. In some aspects, the method includes transmitting a UE capability indicator indicating a multi-control channel group capability. In some aspects, each downlink cell of the first group of downlink cells is associated with a first value for a control resource set (CORESET) pool index and each downlink cell of the second group of downlink cells is associated with a second value for the CORESET pool index. In some aspects, the first TRP is associated with the first value for the CORESET pool index and the second TRP is associated with the second value for the CORESET pool index.

In some aspects, a downlink cell, of the first group of downlink cells or the second group of downlink cells, is associated with a respective CORESET pool index value based in connection with one or more CORESETs configured in the downlink cell and associated with the CORESET pool index value. In some aspects, at least one serving cell is associated with both the first value and the second value for the CORESET pool index. In some aspects, the at least one serving cell is included in both the first group of downlink cells and the second group of downlink cells. In some aspects, the first group of downlink cells and the second group of downlink cells are included in a first set of downlink cells; and the UE is further configured with at least a third uplink control cell to transmit a third uplink control channel corresponding to a second set of downlink cells.

In some aspects, the first set of downlink cells and the second set of downlink cells are mutually exclusive sets. In some aspects, at least one TRP is included in both the first set of downlink cells and the second set of downlink cells. In some aspects, the first set of downlink cells is associated with the first TRP and the second TRP, and the second set of downlink cells is associated with a third TRP and a fourth TRP. In some aspects, an uplink shared channel of the second TRP is not scheduled in the first uplink control channel cell. In some aspects, an uplink shared channel of the second TRP does not overlap in time with uplink control information transmission in the first uplink control channel cell. In some aspects, the UE is configured to drop an uplink shared channel of the second TRP that overlaps in time with an uplink control information transmission in the first uplink control channel cell. In some aspects, the UE is configured to drop an uplink control information transmission that does not include hybrid automatic repeat request feedback and that overlaps with an uplink shared channel of the second TRP in the first uplink control channel cell.

In some aspects, a user equipment UE for wireless communication includes: a memory; and one or more processors operatively coupled to the memory, the memory and the one or more processors configured to: identify a first group of downlink cells communicating with a first TRP that is associated with a first uplink control channel cell; identify a second group of downlink cells communicating with a second TRP that is associated with a second uplink control channel cell; transmit first control information associated with the first group of downlink cells, using resources allocated for a first uplink control channel for the first uplink control channel cell, to the first TRP; and transmit second control information associated with the second group of downlink cells, using resources allocated for a second uplink control channel for the second uplink control channel cell, to the second TRP, the second control information being selectively transmitted contemporaneously with the first control information.

In some aspects, the UE is configured for separate hybrid automatic repeat request feedback for the first TRP and the second TRP. In some aspects, the one or more processors are further configured to: transmit a UE capability indicator indicating a multi-control channel group capability. In some aspects, each downlink cell of the first group of downlink cells is associated with a first value for a CORESET pool index and each downlink cell of the second group of downlink cells is associated with a second value for the CORESET pool index. In some aspects, the first TRP is associated with the first value for the CORESET pool index and the second TRP is associated with the second value for the CORESET pool index.

In some aspects, a downlink cell, of the first group of downlink cells or the second group of downlink cells, is associated with a respective CORESET pool index value based in connection with one or more CORESETs configured in the downlink cell and associated with the CORESET pool index value. In some aspects, at least one serving cell is associated with both the first value and the second value for the CORESET pool index. In some aspects, the at least one serving cell is included in both the first group of downlink cells and the second group of downlink cells. In some aspects, the first group of downlink cells and the second group of downlink cells are included in a first set of downlink cells; and the UE is further configured with at least a third uplink control cell to transmit a third uplink control channel corresponding to a second set of downlink cells. In some aspects, the first set of downlink cells and the second set of downlink cells are mutually exclusive sets.

In some aspects, a non-transitory computer-readable medium storing a set of instructions for wireless communication includes: one or more instructions that, when executed by one or more processors of a UE, cause the UE to: identify a first group of downlink cells communicating with a first TRP that is associated with a first uplink control channel cell; identify a second group of downlink cells communicating with a second TRP that is associated with a second uplink control channel cell; transmit first control information associated with the first group of downlink cells, using resources allocated for a first uplink control channel for the first uplink control channel cell, to the first TRP; and transmit second control information associated with the second group of downlink cells, using resources allocated for a second uplink control channel for the second uplink control channel cell, to the second TRP, the second control information being selectively transmitted contemporaneously with the first control information. In some aspects, the UE is configured for separate hybrid automatic repeat request feedback for the first TRP and the second TRP.

In some aspects, an apparatus for wireless communication includes: means for identifying a first group of downlink cells communicating with a first TRP that is associated with a first uplink control channel cell; means for identifying a second group of downlink cells communicating with a second TRP that is associated with a second uplink control channel cell; means for transmitting first control information associated with the first group of downlink cells, using resources allocated for a first uplink control channel for the first uplink control channel cell, to the first TRP; and means for transmitting second control information associated with the second group of downlink cells, using resources allocated for a second uplink control channel for the second uplink control channel cell, to the second TRP, the second control information being selectively transmitted contemporaneously with the first control information. In some aspects, the UE is configured for separate hybrid automatic repeat request feedback for the first TRP and the second TRP.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
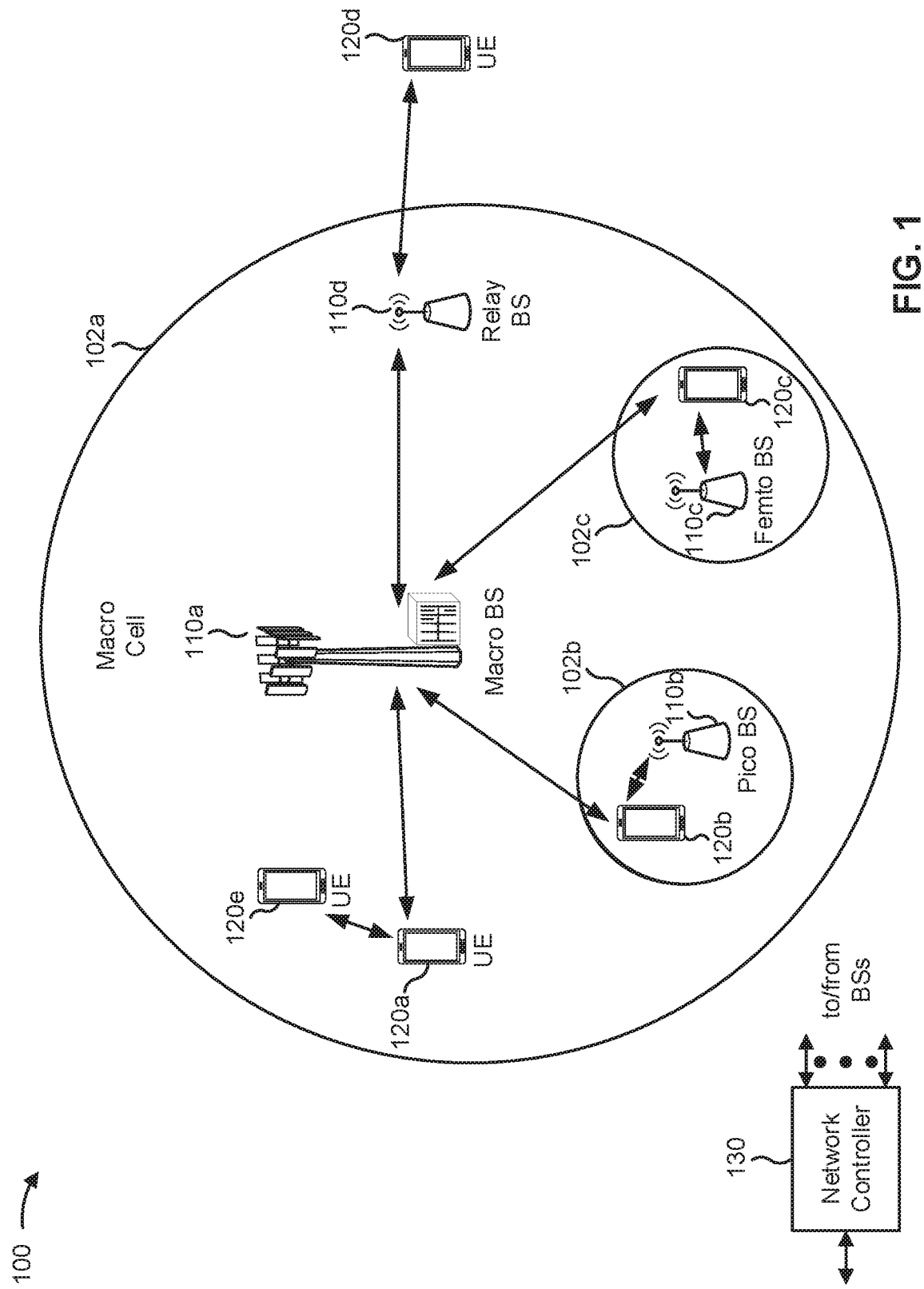
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
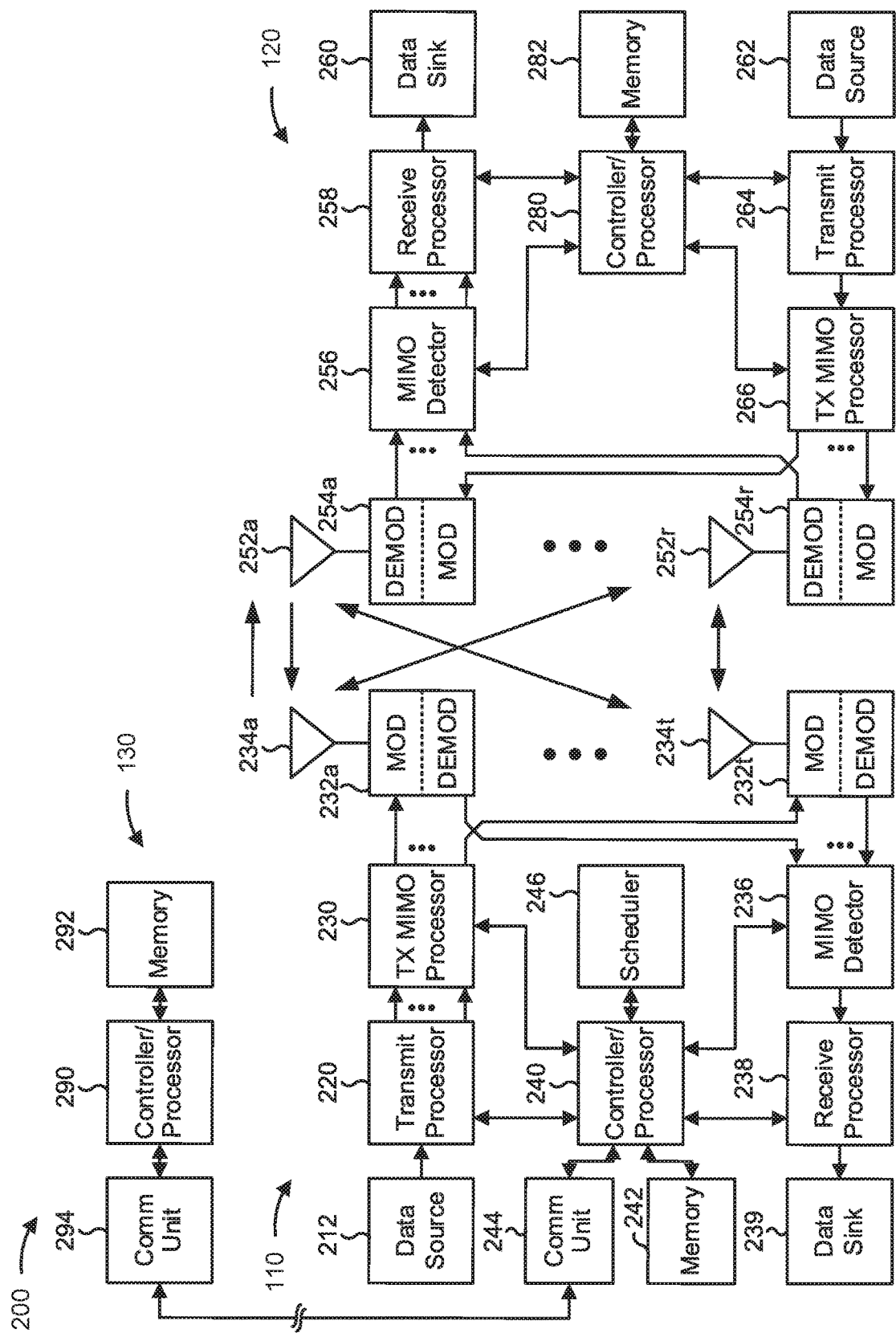
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with managing physical uplink control channel grouping for multiple transmit receive points, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for identifying a first group of downlink cells communicating with a first transmit receive point (TRP) that is associated with a first uplink control channel cell, means for identifying a second group of downlink cells communicating with a second TRP that is associated with a second uplink control channel cell, means for transmitting first control information associated with the first group of downlink cells, using resources allocated for a first uplink control channel for the first uplink control channel cell, to the first TRP, means for transmitting second control information associated with the second group of downlink cells, using resources allocated for a second uplink control channel for the second uplink control channel cell, to the second TRP, the second control information being selectively transmitted contemporaneously with the first control information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, a UE may connect to a plurality of TRPs (e.g., which may be, or may be part of, a plurality of BSs). The UE may receive a first downlink control information (DCI) from a first TRP to schedule a first physical downlink shared channel (PDSCH) transmission from the first TRP. Similarly, the UE may receive a second DCI from a second TRP to schedule a second PDSCH transmission from the second TRP. The UE may use different control resource sets (CORESETs) to monitor for different DCIs (e.g., the first DCI, the second DCI, and/or the like). The UE may identify the different TRPs based at least in part on CORESET group identifiers, such as higher layer signaling indices that are defined for each CORESET.

The UE may transmit hybrid automatic repeat request (HARD) feedback on a physical uplink control channel (PUCCH) resource to, for example, acknowledge received PDSCH transmissions (e.g., the first PDSCH transmission, the second PDSCH transmission, and/or the like). For example, the UE may transmit a joint acknowledgement (ACK) or negative acknowledgement (NACK) message, using a single PUCCH resource, to the plurality of TRPs. Alternatively, the UE may transmit separate HARQ feedback using separate PUCCH resources. For example, the UE may transmit first HARQ feedback, using a first PUCCH resource, to the first TRP and second HARQ feedback, using a second PUCCH resource, to the second TRP.

In some cases, a collision may occur between different scheduled transmissions. The UE may be configured with multiplexing rules for resolving the collisions between the different scheduled transmissions (e.g., a rule for resolving which transmission to drop, whether to multiplex transmissions, and/or the like). For example, the UE may be configured with a collision rule for a collision between a physical uplink shared channel (PUSCH) transmission and a PUCCH transmission. Additionally, or alternatively, the UE may be configured with a collision rule for a collision between a plurality of different types of transmissions using resources of the same channel. For example, the UE may be configured with a collision rule for a HARQ feedback transmission on PUCCH resources colliding with a scheduling request (SR) transmission on PUCCH resources. Similarly, the UE may be configured with collision rules for a PUCCH HARQ feedback transmission and a PUCCH channel state information (CSI) transmission; a PUCCH SR transmission and a PUCCH CSI transmission; a PUCCH HARQ feedback transmission, a PUCCH CSI transmission, and a PUCCH SR transmission; and/or the like.

In some cases, based at least in part on the collision rules, the UE may multiplex a plurality of uplink control information (UCI) transmissions on a PUSCH, a PUCCH, and/or the like. For example, the UE may perform rate matching to multiplex a UCI transmission of a PUCCH onto resources of a PUSCH. However, in some cases, multiplexing a UCI transmission onto a PUSCH may not be possible when the UE is communicating with multiple TRPs. For example, the UE may not be able to multiplex two UCIs targeted for two different TRPs onto resources of a single PUSCH. Similarly, the UE may not be able to multiplex a UCI targeted for a first TRP onto resources of a PUSCH targeted for a second TRP. In this case, the UE may drop a UCI transmission of the PUCCH, which may prevent feedback messaging or other types of messaging, or another type of transmission of the PUSCH, which may reduce network throughput, increase network congestion due to retransmission, and/or the like.

Some aspects described herein enable a UE to support a plurality of PUCCH groups, which may enable the UE to transmit first control information, using resources of a first PUCCH associated with a first PUCCH group, to a first TRP contemporaneously with transmitting second control information, using resources of a second PUCCH associated with a second PUCCH group, to a second TRP. In this way, the UE avoids dropping UCIs or PUSCH transmissions, thereby improving network performance, reducing network congestion that would otherwise occur due to retransmissions, and/or the like.

Figure 3:
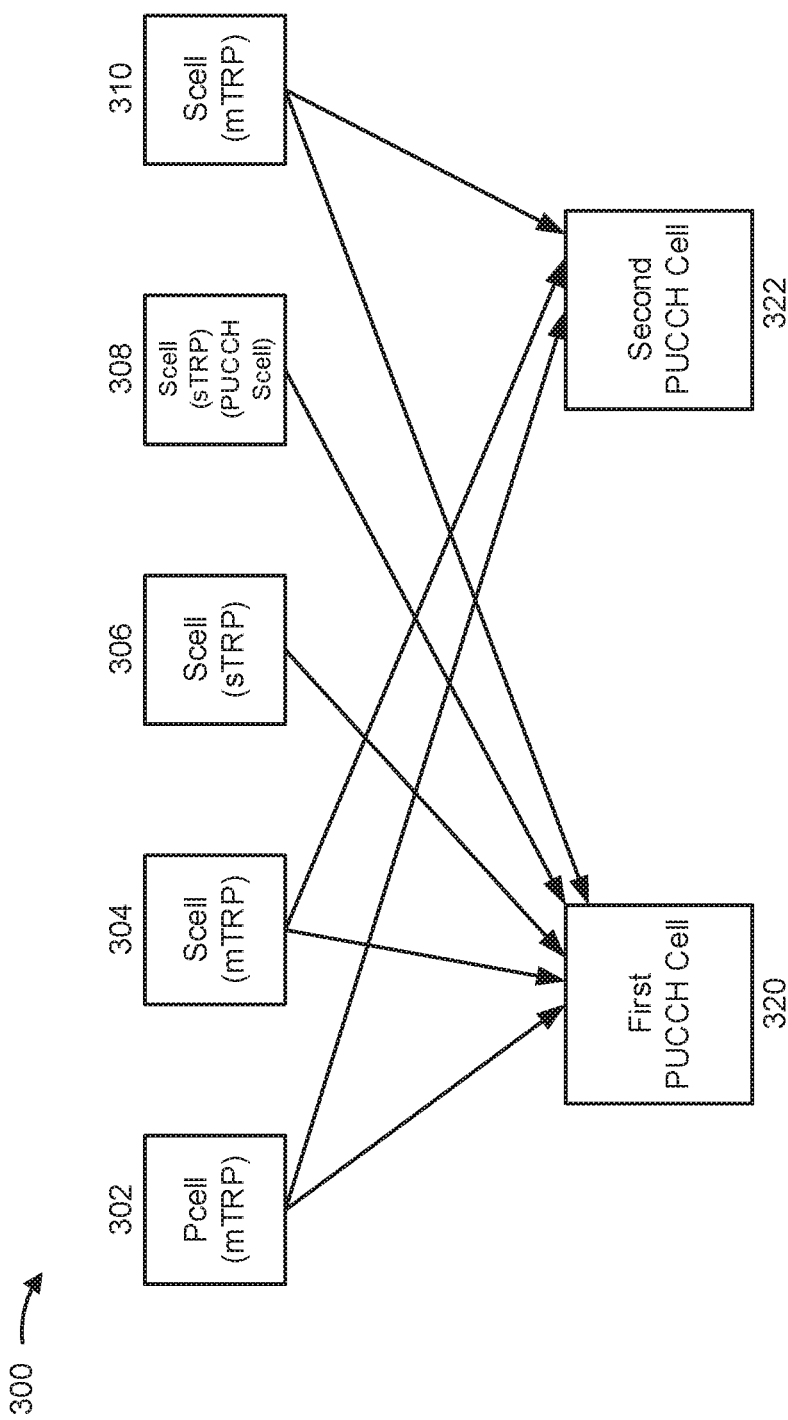
FIGS. 3 and 4 are diagrams illustrating examples of managing physical uplink control channel grouping for multiple transmit receive points, in accordance with various aspects of the present disclosure.

FIG. 3 is a diagram illustrating an example 300 of managing physical uplink control channel grouping for multiple TRPs, in accordance with various aspects of the present disclosure.

As shown in FIG. 3, a cell group (e.g., a master cell group (MCG) or a secondary cell group (SCG), in a carrier aggregation scenario, may include a set of cells. For example, the cell group may include a primary cell 302 (e.g., associated with multi-TRP (mTRP) operation), a secondary cell 304 (e.g., associated with mTRP operation), a secondary cell 306 (e.g., associated with single TRP (sTRP) operation), a secondary cell 308 (e.g., associated with sTRP operation and operating as a PUCCH secondary cell), and a secondary cell 310 (e.g., associated with mTRP operation). In this case, a first PUCCH cell 320 may communicate uplink control information for primary cell 302 and secondary cells 304-310 corresponding to downlink transmissions that are associated with the first TRP (associated with a first value of CORESET Pool Index, e.g., CORESET Pool Index=0). In contrast, a second PUCCH cell may communicate uplink control information from primary cell 302, secondary cell 304, and secondary cell 310 (and not the other secondary cells) corresponding to downlink transmissions that are associated with the second TRP (associated with a second value of CORESET Pool Index, e.g., CORESET Pool Index=1).

In this case, the first PUCCH cell 302 may be associated with a first value for a control resource set (CORESET) pool index and the second PUCCH cell 304 may be associated with a second value for the CORESET pool index (association with a particular CORESET pool index value may include being associated with a cell with a CORESET corresponding to the particular CORESET pool index value). As shown, PUCCH grouping described herein may differ from previous techniques for PUCCH grouping, as described above, wherein a primary PUCCH group is associated with a first subset of cells and a secondary PUCCH group is associated with a second, different subset of cells, and where a PUCCH of the first subset of cells is communicated on a primary cell of the cell group (on the first PUCCH cell) and a PUCCH of the second subset of cells is communicated on the secondary PUCCH cell. That is, the first subset of cells and the second subset of cells are mutually exclusive. For example, in previous techniques, a PUCCH of one cell is either transmitted on the first PUCCH cell or the second PUCCH cell and not both. On the other hand, a PUCCH grouping described herein enables a PUCCH of one cell to be transmitted in both the first and second PUCCH cells depending on the association of the corresponding uplink control information with a TRP or CORESET Pool Index.

As indicated above, FIG. 3 is provided as an example. Other examples may differ from what is described with regard to FIG. 3.

Figure 4:
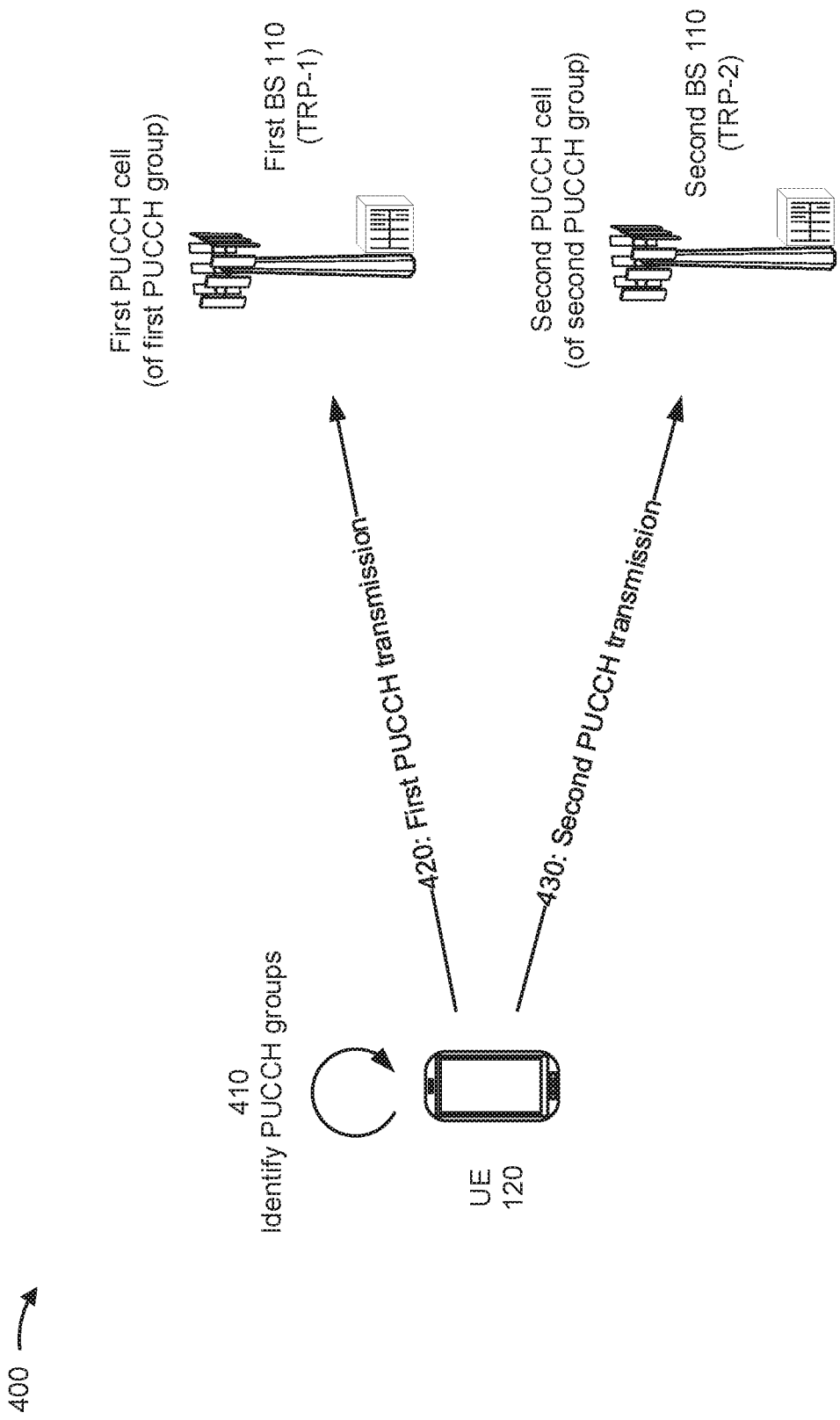

FIG. 4 is a diagram illustrating an example 400 of managing physical uplink control channel grouping for multiple TRPs, in accordance with various aspects of the present disclosure. As shown in FIG. 4, example 400 includes a UE 120 and BSs 110 (e.g., a first BS 110 that is a first TRP and a second BS 110 that is a second TRP). In some aspects, a single BS 110 may function as both the first TRP and the second TRP. While example 400 is described in terms of two TRPs, in some aspects, example 400 may include more than two TRPs in communication with UE 120.

As further shown in FIG. 4, and by reference number 410, UE 120 may identify PUCCH groups. For example, UE 120 may identify a first PUCCH group that is associated with first BS 110, which is providing a first PUCCH cell. Additionally, or alternatively, UE 120 may identify a second PUCCH group that is associated with second BS 110, which is providing a second PUCCH cell.

In some aspects, UE 120 may identify the PUCCH groups after indicating support for PUCCH grouping. For example, UE 120 may indicate (e.g., to first BS 110, second BS 110, and/or the like) that UE 120 supports two PUCCH groups, and may receive configuration information associated with configuring PUCCH grouping for the BSs 110. In some aspects, UE 120 may identify the PUCCH groups based at least in part on an identifier for the PUCCH groups. For example, UE 120 may determine cells (e.g., PUCCH cells) in the first PUCCH group based at least in part on a first value (e.g., an index value of 0) for a higher layer index for a first control resource set (CORESET). Similarly, UE 120 may identify cells (e.g., PUCCH cells) in the second PUCCH group based at least in part on a second value for a higher layer index for a second CORESET. In some aspects, UE 120 may identify one or more cells that are not configured with a value for a higher layer index for a CORESET (e.g., a cell configured for single TRP operation). In this case, UE 120 may determine that the one or more cells are included in a default PUCCH group. In some aspects, UE 120 may determine, based at least in part on a stored configuration, to include cells of the default PUCCH group in the first PUCCH group, the second PUCCH group, and/or the like.

In some aspects, UE 120 may identify a cell that is included in both the first PUCCH group and the second PUCCH group. For example, when a BS 110 is configured for multi-DCI based multi-TRP operation, the first cell of BS 110 may be included in the first cell group (e.g., for a first TRP of the first cell) and in the second cell group (e.g., for a second TRP of the first cell). Additionally, or alternatively, a single BS 110 may provide a plurality of cells associated with a plurality of different PUCCH groups.

In some aspects, UE 120 may identify other configurations of PUCCH groupings. For example, UE 120 may determine that the first PUCCH group and the second PUCCH group are a first PUCCH sub-group of downlink serving cells and a second PUCCH sub-group of downlink serving cells, respectively. In this case, UE 120 may identify a third PUCCH sub-group and a fourth PUCCH sub-group of downlink serving cells and may communicate with TRPs of the four PUCCH sub-groups, as described herein. In some aspects, TRPs of the first PUCCH sub-group and the second PUCCH sub-group may be the same TRPs as in the third PUCCH sub-group and the fourth PUCCH sub-group. In some aspects, TRPs of the first PUCCH sub-group and the second PUCCH sub-group may be different from TRPs of the third PUCCH sub-group and the fourth PUCCH sub-group.

As further shown in FIG. 4, and by reference number 420, UE 120 may transmit a first PUCCH transmission. For example, UE 120 may transmit first control information (e.g., a first UCI) using resources allocated for a first PUCCH of the first PUCCH cell, which is in the first PUCCH group. As shown by reference number 430, UE 120 may transmit a second PUCCH transmission. For example, UE 120 may transmit second control information (e.g., a second UCI) using resources allocated for a second PUCCH of the second PUCCH cell, which is in the second PUCCH group.

In some aspects, UE 120 may transmit using resources of the first PUCCH and resources of the second PUCCH contemporaneously. For example, UE 120 may transmit the first PUCCH transmission and the second PUCCH transmission simultaneously. Additionally, or alternatively, UE 120 may transmit the first PUCCH transmission and the second PUCCH transmission concurrently. Additionally, or alternatively, UE 120 may be scheduled to transmit the first PUCCH transmission and the second PUCCH transmission concurrently, but may drop at least one of the first PUCCH transmission or the second PUCCH transmission based at least in part on a lack of UCI for transmission.

In some aspects, UE 120 may transmit HARQ feedback. For example, based at least in part on radio resource control (RRC) signaling configuring the HARQ feedback, UE 120 may transmit separate HARQ feedback (e.g., first HARQ feedback to first BS 110 and second HARQ feedback to second BS 110). In some aspects, UE 120 and/or the BSs 110 may schedule transmissions to avoid a collision between a UCI (e.g., associated with the first TRP) and a PUSCH transmission (e.g., associated with the second TRP). For example, the first CORESET (e.g., with the first higher layer index value) may not schedule an uplink DCI in a serving cell for the second TRP (e.g., the second PUCCH cell) and the second CORESET may not schedule an uplink DCI in a serving cell for the first TRP (e.g., the first PUCCH cell), thereby avoiding a collision.

Additionally, or alternatively, UE 120 may time division multiplex a PUSCH of the second TRP with transmissions of the first PUCCH cell (e.g., when a PUSCH of the second TRP is scheduled for resources of the first PUCCH cell). Additionally, or alternatively, UE 120 may determine to drop the PUSCH. For example, when a PUSCH of the second TRP is scheduled in resources of the first PUCCH cell and overlapping in time with, for example, a UCI transmission using the resources of the first PUCCH cell, UE 120 may determine to drop the PUSCH. Additionally, or alternatively, UE 120 may determine to drop the UCI transmission (e.g., when a PUSCH of the second TRP is scheduled in resources of the first PUCCH cell and overlapping in time with the UCI transmission) based at least in part on a type of the UCI transmission. For example, when the UCI transmission does not include a HARQ feedback message (e.g., a HARQ ACK), UE 120 may drop the UCI transmission of the first PUCCH cell to avoid collision with the PUSCH of the second TRP.

As indicated above, FIG. 4 is provided as an example. Other examples may differ from what is described with respect to FIG. 4.

Figure 5:
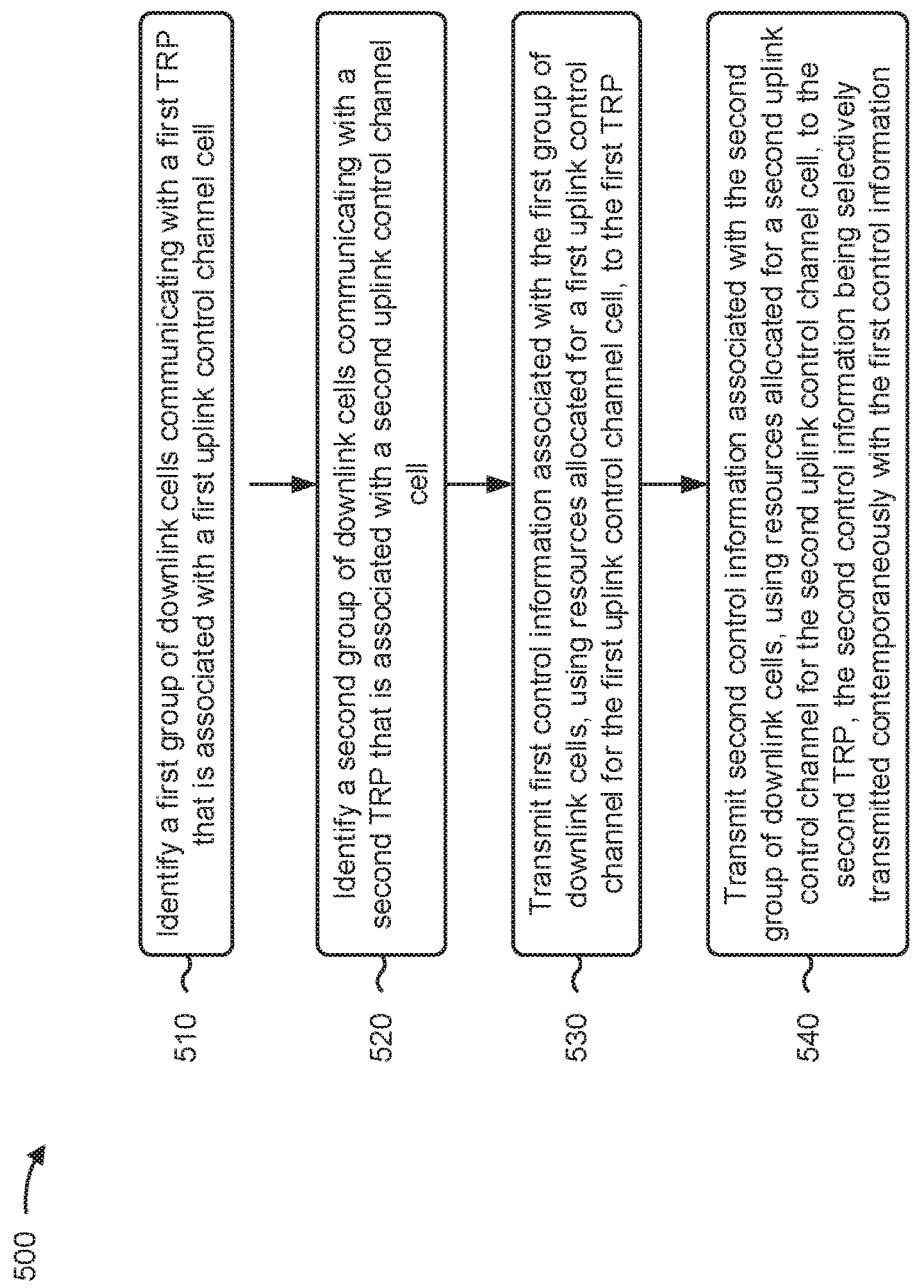
FIG. 5 is a diagram illustrating an example process performed, for example, by a user equipment, in accordance with various aspects of the present disclosure.

FIG. 5 is a diagram illustrating an example process 500 performed, for example, by a user equipment (UE), in accordance with various aspects of the present disclosure. Example process 500 is an example where the UE (e.g., UE 120, the apparatus 602, and/or the like) performs operations associated with techniques for managing physical uplink control channel grouping for multiple transmit receive points.

As shown in FIG. 5, in some aspects, process 500 may include identifying a first group of downlink cells communicating with a first transmit receive point (TRP) that is associated with a first uplink control channel cell (block 510). For example, the UE (e.g., using receive processor 258, transmit processor 264, controller/processor 280, memory 282, and/or the like) may identify a first group of downlink cells communicating with a first transmit receive point (TRP) that is associated with a first uplink control channel cell, as described above. In some aspects, the UE 120 may include means for identifying the first group of downlink cells, such as controller/processor 280 and/or the like.

As further shown in FIG. 5, in some aspects, process 500 may include identifying a second group of downlink cells communicating with a second TRP that is associated with a second uplink control channel cell (block 520). For example, the UE (e.g., using receive processor 258, transmit processor 264, controller/processor 280, memory 282, and/or the like) may identify a second group of downlink cells communicating with a second TRP that is associated with a second uplink control channel cell, as described above. In some aspects, the UE 120 may include means for identifying the second group of downlink cells, such as controller/processor 280 and/or the like.

As further shown in FIG. 5, in some aspects, process 500 may include transmitting first control information associated with the first group of downlink cells, using resources allocated for a first uplink control channel for the first uplink control channel cell, to the first TRP (block 530). For example, the UE (e.g., using receive processor 258, transmit processor 264, controller/processor 280, memory 282, and/or the like) may transmit first control information associated with the first group of downlink cells, using resources allocated for a first uplink control channel for the first uplink control channel cell, to the first TRP, as described above. In some aspects, the UE 120 may include means for transmitting first control information, such as controller/processor 280, transmit processor 264, TX MIMO processor 266, MOD 254, antenna 252, and/or the like.

As further shown in FIG. 5, in some aspects, process 500 may include transmitting second control information associated with the second group of downlink cells, using resources allocated for a second uplink control channel for the second uplink control channel cell, to the second TRP, the second control information being selectively transmitted contemporaneously with the first control information (block 540). For example, the UE (e.g., using receive processor 258, transmit processor 264, controller/processor 280, memory 282, and/or the like) may transmit second control information associated with the second group of downlink cells, using resources allocated for a second uplink control channel for the second uplink control channel cell, to the second TRP, the second control information being selectively transmitted contemporaneously with the first control information, as described above. In some aspects, the UE 120 may include means for transmitting second control information, such as controller/processor 280, transmit processor 264, TX MIMO processor 266, MOD 254, antenna 252, and/or the like.

Process 500 may include additional aspects, such as any single aspect or any combination of aspects described below and/or in connection with one or more other processes described elsewhere herein.

In a first aspect, the UE is configured for separate hybrid automatic repeat request feedback for the first TRP and the second TRP.

In a second aspect, alone or in combination with the first aspect, process 500 includes transmitting a UE capability indicator indicating a multi-control channel group capability.

In a third aspect, alone or in combination with one or more of the first and second aspects, each downlink cell of the first group of downlink cells is associated with a first value for a control resource set (CORESET) pool index and each downlink cell of the second group of downlink cells is associated with a second value for the CORESET pool index.

In a fourth aspect, alone or in combination with one or more of the first through third aspects, the first TRP is associated with the first value for the CORESET pool index and the second TRP is associated with the second value for the CORESET pool index.

In a fifth aspect, alone or in combination with one or more of the first through fourth aspects, a downlink cell, of the first group of downlink cells or the second group of downlink cells, is associated with a respective CORESET pool index value based in connection with one or more CORESETs configured in the downlink cell and associated with the CORESET pool index value.

In a sixth aspect, alone or in combination with one or more of the first through fifth aspects, at least one serving cell is associated with both the first value and the second value for the CORESET pool index.

In a seventh aspect, alone or in combination with one or more of the first through sixth aspects, the at least one serving cell is included in both the first group of downlink cells and the second group of downlink cells.

In an eighth aspect, alone or in combination with one or more of the first through seventh aspects, the first group of downlink cells and the second group of downlink cells are included in a first set of downlink cells, and wherein the UE is further configured with at least a third uplink control cell to transmit a third uplink control channel corresponding to a second set of downlink cells.

In a ninth aspect, alone or in combination with one or more of the first through eighth aspects, the first set of downlink cells and the second set of downlink cells are mutually exclusive sets.

In a tenth aspect, alone or in combination with one or more of the first through ninth aspects, at least one TRP is included in both the first set of downlink cells and the second set of downlink cells.

In an eleventh aspect, alone or in combination with one or more of the first through tenth aspects, the first set of downlink cells is associated with the first TRP and the second TRP, and wherein the second set of downlink cells is associated with a third TRP and a fourth TRP.

In a twelfth aspect, alone or in combination with one or more of the first through eleventh aspects, an uplink shared channel of the second TRP is not scheduled in the first uplink control channel cell.

In a thirteenth aspect, alone or in combination with one or more of the first through twelfth aspects, an uplink shared channel of the second TRP does not overlap in time with uplink control information transmission in the first uplink control channel cell.

In a fourteenth aspect, alone or in combination with one or more of the first through thirteenth aspects, the UE is configured to drop an uplink shared channel of the second TRP that overlaps in time with an uplink control information transmission in the first uplink control channel cell.

In a fifteenth aspect, alone or in combination with one or more of the first through fourteenth aspects, the UE is configured to drop an uplink control information transmission that does not include hybrid automatic repeat request feedback and that overlaps with an uplink shared channel of the second TRP in the first uplink control channel cell.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
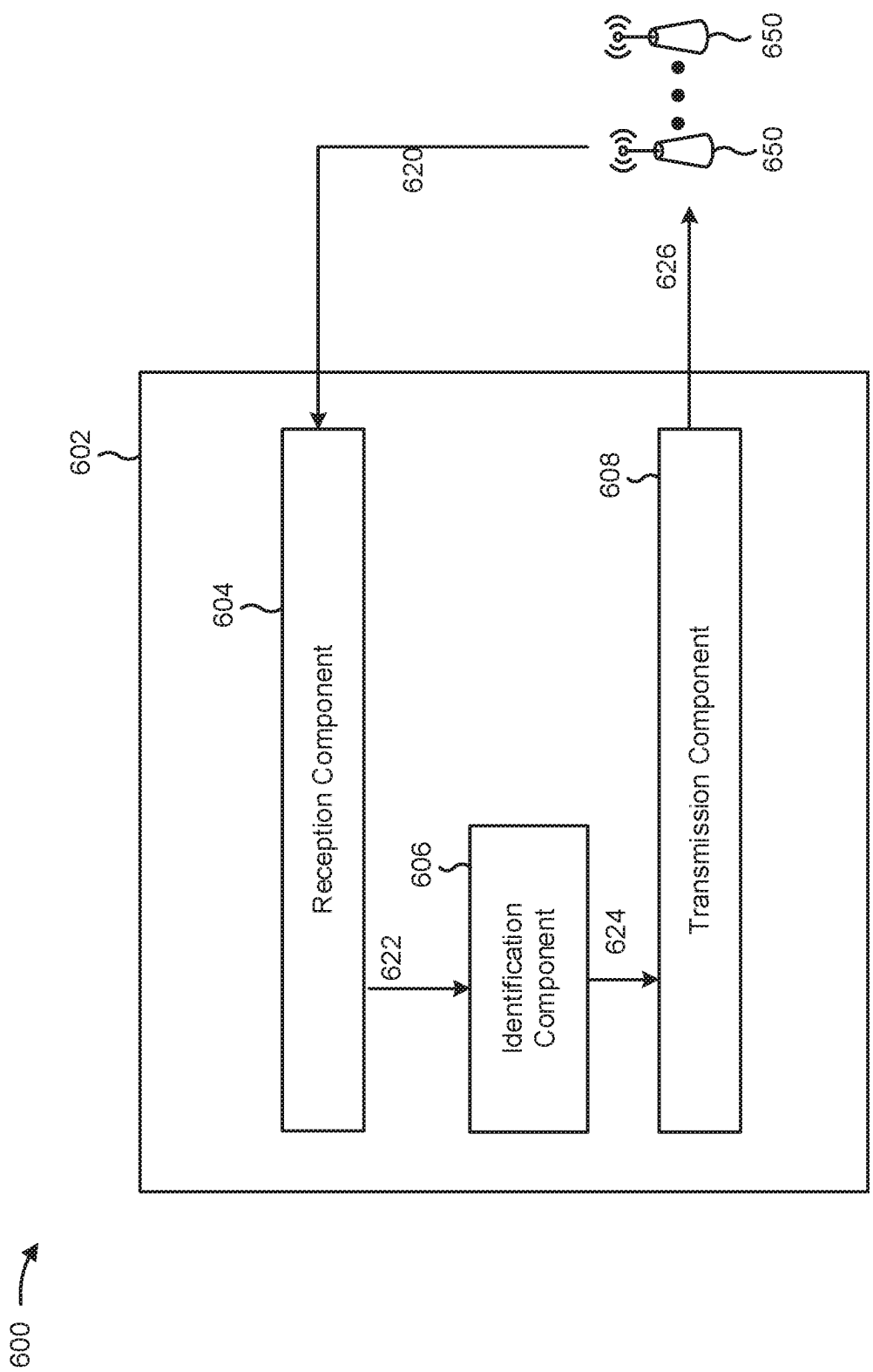
FIG. 6 is a conceptual data flow diagram illustrating a data flow between different modules/means/components in an example apparatus, in accordance with various aspects of the present disclosure.

FIG. 6 is a conceptual data flow diagram 600 illustrating a data flow between different modules/means/components in an example apparatus 602. The apparatus 602 may be a UE (e.g., UE 120). In some aspects, the apparatus 602 includes a reception component 604, an identification component 606, and/or a transmission component 608.

Reception component 604 may receive data 620 from BSs 650. For example, reception component 604 may receive RRC signaling associated with configuring the apparatus 602 for separate HARQ-ACK feedback for the BSs 650. Additionally, or alternatively, reception component 604 may receive CORESET configuration information configuring scheduling of resources associated with a first PUCCH transmission (e.g., a first control information transmission of a first PUCCH) in a first PUCCH cell to a first TRP (e.g., of a first BS 650) and resources associated with a second PUCCH transmission in a second PUCCH cell to a second TRP (e.g., of a second BS 650).

Identification component 606 may receive data 622 from reception component 604 and may identify PUCCH groups for TRPs of BSs 650. For example, identification component 606 may identify a first PUCCH group for a first PUCCH cell of a first BS 650 and a second PUCCH group for a second PUCCH cell of a second BS 650. In some aspects, identification component 606 may identify the PUCCH groups based at least in part on higher layer indices of different CORESETs of the different PUCCH groups.

Transmission component 608 may receive data 624 identifying the PUCCH groups and may transmit data 626 to the BSs 650. For example, transmission component 608 may transmit first control information of a first PUCCH to a first BS 650 of a first PUCCH group and may transmit second control information of a second PUCCH to a second BS 650 of a second PUCCH group.

The apparatus 602 may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying a first group of downlink carriers communicating with a first transmit receive point (TRP) that is associated with a first uplink control channel cell, wherein a first downlink carrier of the first group of downlink carriers is associated with a first value for a control resource set (CORESET) pool index;
   identifying a second group of downlink carriers communicating with a second TRP that is associated with a second uplink control channel cell, wherein a second downlink carrier of the second group of downlink carriers is associated with a second value for the CORESET pool index;
   transmitting first control information associated with the first group of downlink carriers, using resources allocated for a first uplink control channel for the first uplink control channel cell, to the first TRP; and
   transmitting second control information associated with the second group of downlink carriers, using resources allocated for a second uplink control channel for the second uplink control channel cell, to the second TRP, the second control information being selectively transmitted contemporaneously with the first control information.

2. The method of claim 1, wherein the UE is configured for separate hybrid automatic repeat request feedback for the first TRP and the second TRP.

3. The method of claim 1, further comprising:
   transmitting a UE capability indicator indicating a multi-control channel group capability.

4. The method of claim 1, wherein the first TRP is associated with the first value for the CORESET pool index and the second TRP is associated with the second value for the CORESET pool index.

5. The method of claim 1, wherein the first downlink carrier is associated with the first value for the CORESET pool index based in connection with one or more CORESETs configured in the first downlink carrier.

6. The method of claim 1, wherein at least one serving cell is associated with both the first value for the CORESET pool index and the second value for the CORESET pool index.

7. The method of claim 6, wherein the at least one serving cell is included in both the first group of downlink carriers and the second group of downlink carriers.

8. The method of claim 1, wherein the first group of downlink carriers and the second group of downlink carriers are included in a first set of downlink carriers; and
   wherein the UE is further configured with at least a third uplink control cell to transmit a third uplink control channel corresponding to a second set of downlink carriers.

9. The method of claim 8, wherein the first set of downlink carriers and the second set of downlink carriers are mutually exclusive sets.

10. The method of claim 8, wherein at least one TRP is included in both the first set of downlink carriers and the second set of downlink carriers.

11. The method of claim 8, wherein the first set of downlink carriers is associated with the first TRP and the second TRP, and
    wherein the second set of downlink carriers is associated with a third TRP and a fourth TRP.

12. The method of claim 1, wherein an uplink shared channel of the second TRP is not scheduled in the first uplink control channel cell.

13. The method of claim 1, wherein an uplink shared channel of the second TRP does not overlap in time with uplink control information transmission in the first uplink control channel cell.

14. The method of claim 1, further comprising:
    dropping an uplink shared channel of the second TRP that overlaps in time with an uplink control information transmission in the first uplink control channel cell.

15. The method of claim 1, further comprising:
    dropping an uplink control information transmission that does not include hybrid automatic repeat request feedback and that overlaps with an uplink shared channel of the second TRP in the first uplink control channel cell.

16. A user equipment (UE) for wireless communication, comprising:
    a memory; and
    one or more processors configured to:
      identify a first group of downlink carriers communicating with a first transmit receive point (TRP) that is associated with a first uplink control channel cell, wherein a first downlink carrier of the first group of downlink carriers is associated with a first value for a control resource set (CORESET) pool index;
      identify a second group of downlink carriers communicating with a second TRP that is associated with a second uplink control channel cell, wherein a second downlink carrier of the second group of downlink carriers is associated with a second value for the CORESET pool index;

transmit first control information associated with the first group of downlink carriers, using resources allocated for a first uplink control channel for the first uplink control channel cell, to the first TRP; and transmit second control information associated with the second group of downlink carriers, using resources allocated for a second uplink control channel for the second uplink control channel cell, to the second TRP, the second control information being selectively transmitted contemporaneously with the first control information.

17. The UE of claim 16, wherein the UE is configured for separate hybrid automatic repeat request feedback for the first TRP and the second TRP.

18. The UE of claim 16, wherein the one or more processors are further configured to:
transmit a UE capability indicator indicating a multi-control channel group capability.

19. The UE of claim 16, wherein the first TRP is associated with the first value for the CORESET pool index and the second TRP is associated with the second value for the CORESET pool index.

20. The UE of claim 16, wherein the first downlink carrier is associated with the first value for the CORESET pool index based in connection with one or more CORESETs configured in the first downlink carrier.

21. The UE of claim 16, wherein at least one serving cell is associated with both the first value for the CORESET pool index and the second value for the CORESET pool index.

22. The UE of claim 21, wherein the at least one serving cell is included in both the first group of downlink carriers and the second group of downlink carriers.

23. The UE of claim 16, wherein the first group of downlink carriers and the second group of downlink carriers are included in a first set of downlink carriers; and
wherein the UE is further configured with at least a third uplink control cell to transmit a third uplink control channel corresponding to a second set of downlink carriers.

24. The UE of claim 23, wherein the first set of downlink carriers and the second set of downlink carriers are mutually exclusive sets.

25. A non-transitory computer-readable medium storing a set of instructions for wireless communication, the set of instructions comprising:
one or more instructions that, when executed by one or more processors of a user equipment (UE), cause the UE to:
identify a first group of downlink carriers communicating with a first transmit receive point (TRP) that is associated with a first uplink control channel cell, wherein a first downlink carrier of the first group of downlink carriers is associated with a first value for a control resource set (CORESET) pool index;
identify a second group of downlink carriers communicating with a second TRP that is associated with a second uplink control channel cell, wherein a second downlink carrier of the second group of downlink carriers is associated with a second value for the CORESET pool index;
transmit first control information associated with the first group of downlink carriers, using resources allocated for a first uplink control channel for the first uplink control channel cell, to the first TRP; and
transmit second control information associated with the second group of downlink carriers, using resources allocated for a second uplink control channel for the second uplink control channel cell, to the second TRP, the second control information being selectively transmitted contemporaneously with the first control information.

26. The non-transitory computer-readable medium of claim 25, wherein the UE is configured for separate hybrid automatic repeat request feedback for the first TRP and the second TRP.

27. An apparatus for wireless communication, comprising:
means for identifying a first group of downlink carriers communicating with a first transmit receive point (TRP) that is associated with a first uplink control channel cell, wherein a first downlink carrier of the first group of downlink carriers is associated with a first value for a control resource set (CORESET) pool index;
means for identifying a second group of downlink carriers communicating with a second TRP that is associated with a second uplink control channel cell, wherein a second downlink carrier of the second group of downlink carriers is associated with a second value for the CORESET pool index;
means for transmitting first control information associated with the first group of downlink carriers, using resources allocated for a first uplink control channel for the first uplink control channel cell, to the first TRP; and
means for transmitting second control information associated with the second group of downlink carriers, using resources allocated for a second uplink control channel for the second uplink control channel cell, to the second TRP, the second control information being selectively transmitted contemporaneously with the first control information.

28. The apparatus of claim 27, wherein the UE is configured for separate hybrid automatic repeat request feedback for the first TRP and the second TRP.

29. The UE of claim 16, wherein an uplink shared channel of the second TRP is not scheduled in the first uplink control channel cell.

30. The UE of claim 16, wherein an uplink shared channel of the second TRP does not overlap in time with uplink control information transmission in the first uplink control channel cell.

* * * * *